Aug. 23, 1966

H. A. STEINBRUEGGE 3,268,796

ELECTRICAL CONTROL APPARATUS

Filed March 26, 1963

WITNESSES
Theodore F. Wrobel
Ronald R. Lackey

INVENTOR
Harold A. Steinbruegge
BY
F. E. Browder
ATTORNEY

United States Patent Office 3,268,796
Patented August 23, 1966

---

3,268,796
ELECTRICAL CONTROL APPARATUS
Harold A. Steinbruegge, Pittsburgh, Pa., assignor to Westinghouse Electric Corporation, Pittsburgh, Pa., a corporation of Pennsylvania
Filed Mar. 26, 1963, Ser. No. 268,100
2 Claims. (Cl. 322—28)

This invention relates in general to electrical apparatus and, more particularly, to regulator systems for use with dynamoelectric machines, such as generators.

It is an object of this invention to provide a new and improved regulator system for dynamoelectric machines.

It is a further object of this invention to provide a new and improved regulator system for alternating current generators that utilizes all solid-state devices.

Another object of this invention is to provide a new and improved regulator system that utilizes a variable impedance semiconductor device in series with the field winding of a direct current exciter which controls the excitation of an alternating current generator.

Another object of this invention is to provide a regulating system using variable impedance semiconductor devices connected in series circuit relation with the field excitation winding of a dynamoelectric machine in which the power dissipated in the semiconductor devices is reduced.

A further object of this invention is to provide a regulating system using variable impedance semiconductor devices which includes new and improved apparatus and circuitry for preventing damaging voltages from being applied to the semiconductor devices.

Still another object of this invention is to provide a regulating system for a dynamoelectric machine which utilizes a plurality of parallel connected variable impedance semiconductor devices in series with the field winding of the dynamoelectric machine which includes new and improved apparatus and circuitry which allows complete saturation of the parallel connected semiconductor devices.

Briefly, the present invention accomplishes the above-cited objects by controlling the impedance of a semi-conductor device connected in series circuit relation with the field winding of a direct current exciter. More specifically, the direct current excitation applied to the field winding of an alternating current generator by a rotating direct current exciter is controlled by varying the current applied to the field winding of the direct current exciter. The current applied to the field winding of the direct current exciter is varied by a transistor connected in series circuit relation with said field winding. The transistor is connected in circuit relation with the output terminals and hence the output voltage of the alternating current generator through a rectifier and error detecting bridge arrangement. The output of the error detecting bridge is connected to the base or control electrode of the transistor and the impedance of the transistor is thus varied in response to the error signal. Changes in the output voltage of the alternating current generator from the desired magnitude result in a responsive change in the current applied to the field winding of the direct current exciter, thus changing the output voltage of said exciter. The change in the output voltage of the direct current exciter results in a change in the current flowing through the field winding of the alternating current generator and the output of the alternating current generator is changed so that it is substantially the same as the predetermined value.

In order to minimize the power dissipation in the transistor connected in series circuit relation with the field excitation winding of the dynamoelectric machine, an impedance having a magnitude exceeding the magnitude of the air-gap impedance of the dynamoelectric machine may be connected from the collector to the emitter electrodes of the transistor. This impedance also protects the transistor by reducing the collector to emitter voltage of the transistor.

Destructive voltages may be reduced and the transistor connected in series circuit relation with the field excitation winding of a dynamoelectric machine protected by connecting a semiconductor device having a Zener type characteristic from the collector to base electrodes of the transistor. Therefore, even though the regulator system is not calling for the transistor to conduct, any current flow through the Zener type device will cause enough base current to flow to prevent the voltage across the transistor from reaching damaging magnitudes.

When it is necessary to connect a plurality of transistors in parallel circuit relation with one another in order to obtain large current carrying capacities for the excitation field winding connected in series circuit relation with the parallel connected transistors, sufficient drive current may be obtained from a drive transistor to cause the parallel connected transistor to reach complete saturation by connecting an impedance in the collector circuit of the parallel connected transistors. The voltage drop across this impedance provides sufficient collector-to-emitter voltage for the driver transistor to produce the necessary base drive current.

Further objects and advantages of this invention will become apparent as the following description proceeds and features of novelty which characterize the invention will be pointed out in particularity in the claims annexed to and forming a part of this specification.

For a better understanding of the invention, reference may be had to the following detailed description taken in connection with the accompanying drawings, in which.

Figure 1:
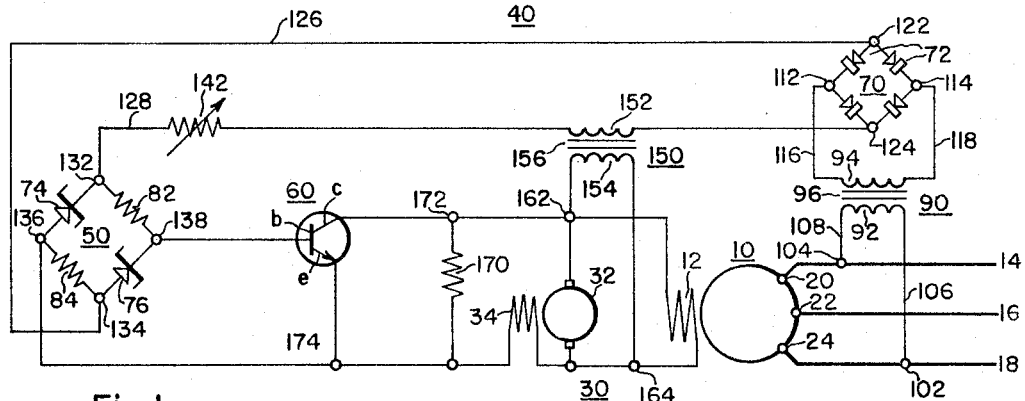
FIGURE 1 shows a schematic diagram illustrating one embodiment of the invention.

Referring to the drawings, in which like reference numerals in the various figures represent like components, there is illustrated in FIG. 1 a dynamoelectric machine, specifically a synchronous generator 10 having an excitation or field winding 12. In this instance, the synchronous generator is disposed to supply power to line conductors 14, 16 and 18, from output terminals 20, 22 and 24, respectively.

In order to obtain an excitation voltage across field winding 12 of relatively large magnitude, a direct current exciter 30 is provided. In this instance, the exciter 30 comprises an armature 32, which supplies current to the field winding 12 of synchronous generator 10, and a self-exciting field winding 34 which is connected in circuit relation with the armature 32. In order to maintain the output voltage of the synchronous generator 10 substantially constant, a regulator system 40, comprising a sensing circuit 50 for producing a direct current error signal which is a measure of the deviation of the output voltage of the synchronous generator 10 from its regulated value, and a transistor 60 responsive to the direct current error signal, is interconnected between the output of the synchronous generator 10 and the field winding 34 of the exciter 30.

More specifically, the regulating system 40 comprises rectifier bridge arrangement 70, which may have a plurality of semiconductor diodes 72, sensing circuit 50, which may be a bridge circuit having Zener diodes 74 and 76 and resistors 82 and 84, and transistor 60, which may be of the NPN type having a main or emitter electrode $e$, another main or collector electrode $c$ and a control or base electrode $b$.

In order to make the regulating system 40 responsive to the output voltage of the generator 10 and also obtain the proper magnitude of potential for the operation of the regulating system, a potential transformer 90 is connected, in this instance, to generator line conductors 14 and 18. More specifically, potential transformer 90 includes windings 92 and 94 inductively disposed relative to magnetic core 96. Winding 92 is connected to generator line conductors 14 and 18 at terminals 102 and 104 through lines 106 and 108, respectively. Winding 94 is connected to terminals 112 and 114 of bridge rectifier 70 through line conductors 116 and 118, respectively.

Bridge rectifier 70 receives the alternating potential responsive to the output voltage of generator 10 at its terminals 112 and 114 and provides a unidirectional potential at its terminals 122 and 124 which is also responsive to the output voltage of the generator 10.

In the case of unbalanced loads, it may be desirable to use a three-phase potential transformer in place of the single-phase transformer 90, and a three-phase bridge circuit in place of the single-phase bridge circuit 70.

In order to maintain the voltage output of generator 10 at a predetermined magnitude, the direct current signal from terminals 122 and 124 of bridge rectifier 70 is applied through line conductors 126 and 128 to sensing circuit 50 at terminals 132 and 134. Sensing circuit 50, in this instance, may be a bridge circuit having Zener diodes 74 and 76 in two legs of the bridge and resistors 82 and 84 in the remaining two legs. When a direct current voltage is applied to the input terminals 132 and 134 which is equal to twice the voltage drop across each Zener diode 74 and 76, there will be substantially no voltage difference appearing at the output terminals 136 and 138. When the input voltage is above or below the reference voltage of the bridge 50, then a unidirectional voltage difference or error signal will exist across the output terminals 136 and 138. The polarity of this error signal depends upon whether the input voltage is above or below the reference voltage of the bridge circuit. Adjustable resistor or rheostat 142, connected in series circuit relation between terminal 124 of rectifier 70 and terminal 132 of sensing circuit 50, provides manual selection of the desired regulated voltage to be maintained by the generator 10.

The output voltage of the generator 10 is regulated in response to the error signal produced at terminals 136 and 138 of sensing circuit 50 by applying said error signal to a variable impedance device connected in series circuit relation with the field winding 34 of the exciter 30. The variable impedance device may be an NPN transistor 60, having its collector and emitter electrodes $c$ and $e$ connected in series circuit relation with field winding 34. The error signal from sensing circuit 50 is applied to the base and emitter electrodes $b$ and $e$, with terminal 138 being connected to the base electrode $b$ and terminal 136 being connected to the emitter electrode $e$.

The voltage drop across a transistor varies with the base drive current applied thereto. If the base drive current is reduced, the impedance of the transistor increases and the voltage drop across said transistor increases. If the base drive current is increased, the impedance of the transistor decreases and the voltage drop across said transistor decreases. In the NPN junction type transistor, shown at 60, making the base electrode $b$ more positive, with respect to the emitter electrode $e$, increases the base drive current and the impedance of the transistor is decreased, allowing more current to flow through the field winding 34 of the exciter 30. On the other hand, making the base electrode $b$ less positive with respect to the emitter electrode $e$ decreases the base drive current and increases the impedance of the transistor, reducing the current flow through field winding 34 of the exciter 30.

When the alternating current generator output voltage is below the desired regulated value, the bridge or sensing circuit 50 is unbalanced, causing an error signal to be produced which makes the base electrode $b$ more positive than the emitter electrode $e$ of transistor 60. The current flow from the base electrode $b$ to the emitter electrode $e$ reduces the impedance of transistor 60 and the excitation current to the exciter winding 34 is increased. The increase in excitation current in exciter winding 34 increases the exciter output voltage, thus increasing the excitation current applied to field winding 12 of the alternating current generator 10 with a responsive increase of the generator output voltage back to the desired regulated value.

When the terminal voltage of the alternating current generator 10 is above the desired regulated value, the base-emitter junction is reverse biased, with the base being more negative than the emitter, thus causing the transistor to become a high impedance with the consequent reduction in exciter excitation. This is followed by a reduction in the excitation voltage applied to the field winding 12 of the alternating current generator 10, and the generator output voltage is reduced to the desired or predetermined magnitude.

Although the solid-state components of this regulating system give substantially an instantaneous response, a damping means such as a damping transformer 150 may be used to improve system transient response. In this instance, damping transformer 150 has windings 152 and 154 inductively disposed on magnetic core 156, with winding 154 being connected across the armature 32 of exciter 30 at terminals 162 and 164, and winding 152 being connected in a series circuit relationship with rheostat 142 between terminal 124 of rectifier 70 and terminal 132 of sensing circuit 50. Of course, other damping means such as resistance-capacitance damping systems would be equally suitable.

Although the figure illustrates an NPN type transistor 60, a PNP type transistor would be equally suitable. If a PNP type transistor were to be used in place of the NPN type illustrated, the emitter and collector electrodes would be switched with respect to the exciter polarity and, since the emitter-to-base current is amplified in a PNP type transistor, the leads from the sensing circuit 50 to the base-emitter electrodes would be reversed.

Since the transistor 60 is almost continuously operating, somewhere between its cut-off and saturation points, it is important to reduce the power dissipation in transistor 60. This may be accomplished by placing an impedance or resistance having the proper magnitude between the collector and emitter electrodes of transistor 60. More specifically, a resistor 170, having a value greater than the air gap resistance of exciter, i.e., greater than that value of resistance which when placed in series with the exciter field 34 would prevent the exciter output voltage from building up, may be placed across the collector-emitter electrodes of transistor 60 from terminal 172 to terminal 174. Resistor 170 has the twofold effect of reducing the power dissipated in the transistor 60 and of reducing the collector to the emitter voltage of said transistor. A non-linear resistor connected from the collector-to-emitter electrodes would protect the transistor from transient voltage and would keep the response time as short as possible.

In the operation of circuit shown in the FIGURE 1, adjustable resistor or rheostat 142 is set to the desired voltage output that generator 10 is to maintain. A direct current voltage proportional to the alternating current output volage of generator 10 is obtained by potential transformer 90 and bridge rectifier 70, and this voltage is applied to the sensing circuit 50. The magnitude of the direct curent voltage applied to said sensing circuit is modified by the setting of rheostat 142, as previously explained, to give the required manual adjustment of the output voltage of the generator 10. The sensing circuit 50 produces a unidirectional output voltage or error signal at its terminals 136 and 138 with a polarity responsive to whether the voltage output of generator 10 is above or below the desired output voltage and a magnitude responsive to the amount of the deviation. The output or error signal from sensing circuit 50 is applied to the base and emitter electrodes *b* and *e* of transistor responsive to said error signal. The impedance of the transistor 60 determines the amount of excitation current allowed to flow through the self-excited field winding 34 of the exciter system 30. The amount of excitation current flowing through the exciter field winding 34 determines the output voltage of exciter armature 32. Since exciter armature output voltage is applied to the field excitation winding 12 of the synchronous generator 10, the output voltage of generator 10 is thus responsive to the output of sensing circuit 50.

Although the schematic diagram shown in FIG. 1 concerns regulating the output voltage of a synchronous generator by regulating the field current in a rotating direct current exciter, the principles of the invention may be extended to regulating a direct current generator by omitting the bridge rectifier 70 and potential transformer 90 and connecting the regulating circuit 40 directly to the output terminals of the direct current generator.

Further, the direct current exciter may be eliminated in regulating an alternating current generator by rectifying the alternating current from the output of the generator, and controlling the excitation current through the field winding of said alternating current generator by controlling the impedance of a transistor in series with said field winding.

Figure 2:
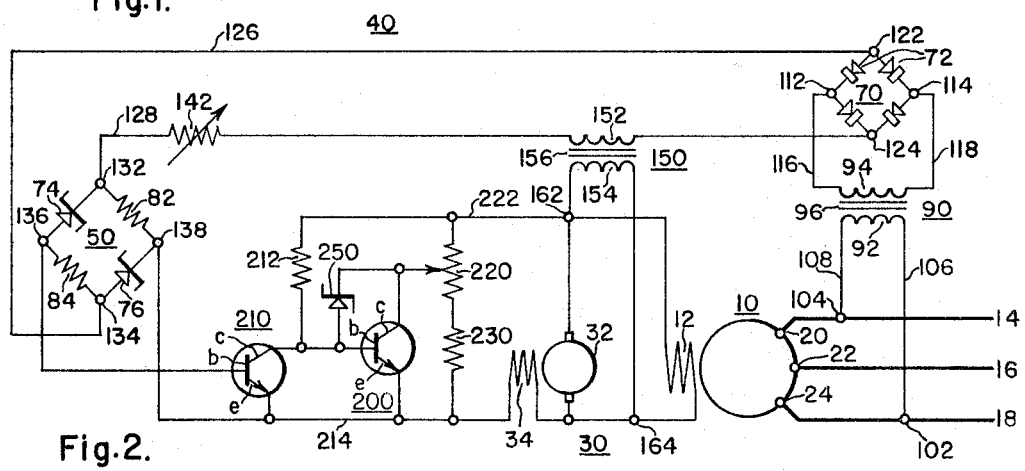
FIG. 2 shows a schematic diagram illustrating another embodiment of the invention.

FIG. 2 illustrates an embodiment of the invention in which the generator 10, exciter 30, potential transformer 90, bridge rectifier 70, and error detecting circuit 50 are similar in function to the like numbered components described relative to FIG. 1. The embodiment shown in FIG. 2 utilizes two transistors 200 and 210, which in this instance are of the NPN type, but may be of the PNP type. Transistor 200, which has a base electrode *b*, collector electrode *c* and emitter electrode *e*, is used as a variable impedance device in series with the field excitation winding 34 of the exciter 30. Transistor 210, which also has a base electrode *b*, collector electrode *c* and emitter electrode *e*, controls the conduction of transistor 200 by shunting base drive current away from the base electrode *b* of transistor 200. Therefore, an increase in current through the collector-emitter circuit of transistor 210, caused by its base electrode *b* becoming more positive with respect to its emitter electrode *e*, is accompanied by a decrease in current through transistor 200 and, therefore, the current through excitation field winding 34 is reduced.

To obtain the proper control signal from error detecting bridge circuit 50, terminal 136 of bridge circuit 50 is connected to the base electrode *b* of transistor 210. Terminal 138 of bridge circuit 50 is connected to the emitter electrode *e* of transistor 210. In order to shunt current away from the base electrode *b* of transistor 200, the collector electrode *c* transistor 210 is connected to the base electrode *b* of transistor 200 and to collector resistor 212. The emitter electrodes *e* of transistors 200 and 210 are connected in common to conductor 214, and conductor 214 is connected to one side of excitation field winding 34.

In order to complete the field excitation circuit, the collector electrode *c* of transistor 200 is connected through its collector resistor 220 to conductor 222, and conductor 222 is connected to terminal 162 and the armature 32 of exciter 30. The collector resistor 212 is also connected to conductor 222.

In order to reduce the power dissipation in transistor 200 and reduce the voltage across its collector-emitter circuit, resistor 230 and the portion of resistance 220 not in the collector circuit of transistor 200, are connected from the emitter electrode *e* to the collector electrode *c* of transistor 200. As hereinbefore stated, the value of this resistance should exceed the air gap resistance of the exciter 30.

In order to prevent voltages across transistor 200 of damaging magnitude, a semiconductor device, such as a Zener diode, may be connected from the emitter to collector electrodes of transistor 200. However, the same result may be obtained using a lower power Zener diode 250 and connecting it from the collector to base electrodes of transistor 200. When Zener diode 250 conducts in its reverse direction, transistor 200 will conduct sufficient current to prevent the voltage from building up to a damaging magnitude.

The operation of the circuit shown in FIG. 2 is similar to the operation of the circuit shown in FIG. 1, except for the addition of driver transistor 210. Transistor 200 varies its impedance and the excitation current flowing through field excitation winding 34 in response to transistor 210 and error detecting circuit 50.

Figure 3:
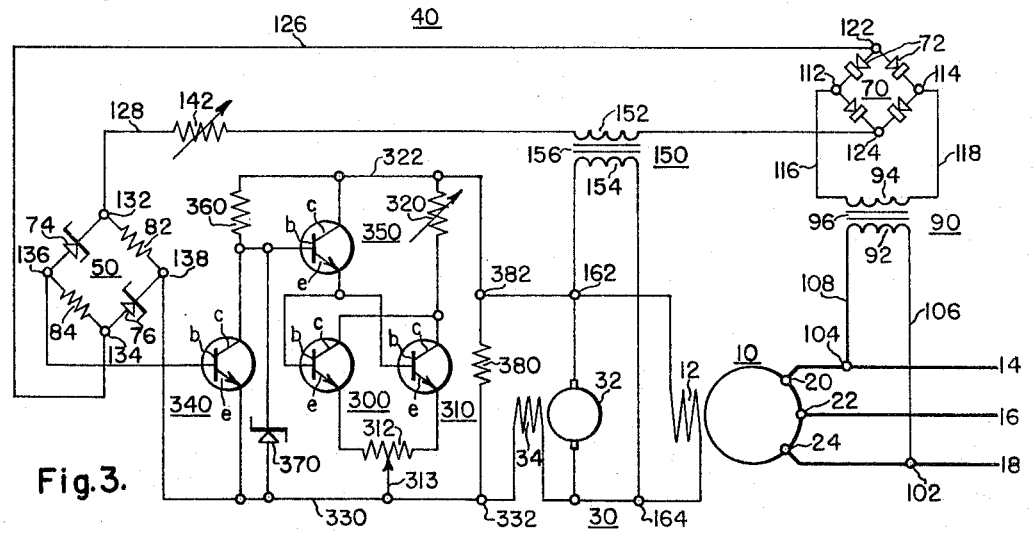
FIG. 3 shows a schematic diagram illustrating another embodiment of the invention.

FIG. 3 illustrates an embodiment of the invention in which the generator 10, exciter 30, potential transformer 90, bridge rectifier 70, and error detecting circuit 50 are similar in function to the like numbered components described relative to FIG. 1. The embodiment shown in FIG. 3 utilizes a plurality of transistors connected in parallel circuit relation to provide the current carrying capability required by field excitation winding 34 of the exciter 30. A problem encountered when using a plurality of parallel connected transistors connected in series circuit relation with the field excitation winding of an exciter is in getting sufficient base drive current for the parallel connected transistors to cause said parallel connected transistors to reach complete saturation. The embodiment shown in FIG. 3 solves the problem by placing a resistor in the collector circuit of the parallel connected transistors and applying the voltage drop across this resistor to a driver transistor. More specifically, transistors 300 and 310 are connected in parallel circuit relation with each other, with their base electrodes *b* connected in common, their collector electrodes *c* connected in common, and their emitter electrodes *e* connected in common through a balancing resistor 312. The parallel circuit comprising transistors 300 and 310 is connected in series circuit relation with the field excitation winding 34 and armature 32 of exciter system 30. This is accomplished by connecting the common collector electrode connection through resistor 320 to conductor 322. Conductor 322 is connected to terminal 162 of armature 32. The movable arm 313 of resistor 312 is connected to conductor 330 and conductor 330 is connected to field winding 34 at junction 332. Transistor 340 is responsive to the error signal produced by error detecting circuit 50, with terminal 136 being connected to the base electrode *b* of transistor 340 and terminal 138 being connected to conductor 330 and the emitter electrode *e* of transistor 340. The impedance of transistor 340 and current flowing through the collector-emitter circuit of transistor 340 is, therefore, responsive to the error detecting circuit 50. The transistor 340 controls the current flowing through transistor 350 by shunting base drive current away from transistor 350. As the current through the collector-emitter circuit of transistor 340 increases, the current flow through the collector-emitter path of transistor 350 decreases. On the other hand, as the current through the collector-emitter circuit of transistor 340 decreases, the current flow through the collector-emitter path of transistor 350 increases. This is accomplished by connecting the collector electrode *c* of transistor 340 to the base electrode *b* of transistor 350. The base electrode *b* of transistor 350 is, in turn, connected to conductor 322 through the collector resistor 360.

The current through the collector-emitter path of transistor 350 controls the conduction of the parallel connected transistors 300 and 310 by providing the base drive current for said transistors. The emitter electrode *e* of transistor 350 is connected to the base electrodes *b* of transistors 300 and 310, and the collector electrode *c* of transistor 350 is connected to conductor 322. It can be seen that the voltage drop across resistor 320 provides the collector-emitter voltage for transistor 350, thereby allowing transistor 350 to conduct sufficient current through its collector-emitter circuit to drive transistors 300 and 310 to complete saturation.

Zener diode 370 is connected from the collector to emitter electrodes of transistor 340 to prevent voltages across transistor 340 from reaching damaging magnitudes.

In order to reduce the power dissipation in transistors 300 and 310 and reduce the voltage across transistors 300 and 310, resistor 380, having a value exceeding the air gap resistance of the exciter 30, may be connected from point 332 to point 382.

It will, therefore, be apparent that there has been disclosed a new and improved regulating system for alternating current generators that utilizes all solid state devices. FIG. 1 discloses a regulating system utilizing a single transistor connected in series circuit relation with the field winding of a direct current exciter and the impedance of said transistor is controlled by an error detecting bridge circuit which feeds directly to the controlling element of the power transistor. Further, there has also been disclosed new and improved apparatus and circuitry which reduces the power dissipation in the transistor connected in series circuit relation with the field winding of dynamoelectric machines, and protects the voltage sensitive semiconductor devices from damaging voltages. Still further, the disclosed invention provides a new and improved means for completely utilizing the current carrying capacities of a plurality of parallel connected transistors.

I claim as my invention:

1. A regulating system for a dynamoelectric machine having a field winding and disposed to produce an electrical potential at output terminals, comprising error detecting means connected to receive a measure of the output potential of said dynamoelectric machine; said error detecting means producing an error signal responsive to a deviation of the output potential of said dynamoelectric machine from a predetermined magnitude; a plurality of transistors each having emitter, collector, and base electrodes; at least two of said plurality of transistors being connected in parallel circuit relation, with their emitter electrodes connected together, their base electrodes connected together, and their collector electrodes connected together; impedance means having first and second terminals; the emitter-collector circuit of said parallel connected transistors, said impedance means, and said field winding being connected in series circuit relation, with the second terminal of said impedance means being connected to the collector electrodes of said parallel connected transistors; one of said plurality of transistors supplying base drive current for said parallel connected transistors, with its emitter electrode being connected to the base electrodes of said parallel connected transistors, and its collector electrode being connected to the first terminal of said impedance means; the voltage drop across said impedance means providing collector-emitter voltage for said driving transistor to aid said driving transistor in providing base drive current for said parallel connected transistors; means connecting said driving transistor with said error detecting means, with the base drive current supplied by said driving transistor to said parallel connected transistors being responsive to the error signal from said error detecting means; the impedance of said parallel connected transistors being responsive to the magnitude of the base drive current supplied by said driver transistor to control the magnitude of current flowing through said field winding and maintain the output potential of said dynamoelectric machine at a predetermined magnitude.

2. A regulating system for a dynamoelectric machine having a field winding and disposed to produce an electrical potential at output terminals, comprising error detecting means connected to receive a measure of the output potential of said dynamoelectric machine; said error detecting means producing an error signal responsive to a deviation of the output potential of said dynamoelectric machine from a predetermined magnitude; a plurality of transistors each having emitter, collector, and base electrodes; at least two of said plurality of transistors being connected in parallel circuit relation, with their emitter electrodes connected together, their base electrodes connected together, and their collector electrodes connected together; first impedance means having first and second terminals; the emitter-collector circuit of said parallel connected transistors, said impedance means, and said field winding being connected in series circuit relation, with the second terminal of said first impedance means being connected to the collector electrode of said parallel connected transistors; one of said plurality of transistors supplying base drive current for said parallel connected transistors, with its emitter electrode being connected to the base electrodes of said parallel connected transistors, and its collector electrode being connected to the first terminal of said first impedance means; the voltage drop across said first impedance means providing collector-emitter voltage for said driving transistor to aid driving transistors in providing base drive current for said parallel connected transistors; means connecting said driving transistor with said error detecting means, with the base drive current supplied by said driving transistor to said parallel connected transistors being responsive to the error signal from said error detecting means; the impedance of said parallel connected transistors being responsive to the magnitude of the base drive current supplied by said driving transistor, to control the magnitude of current flowing through said field winding and maintain the output potential of said dynamoelectric machine at a predetermined magnitude; and second impedance means having a magnitude greater than the air-gap resistance of said dynamoelectric machine; said second impedance means being connected across said serially connected first impedance means and parallel connected transistors, to substantially reduce the power dissipation in said parallel connected transistors.

References Cited by the Examiner

UNITED STATES PATENTS

| | | | |
|---|---|---|---|
| 2,896,149 | 7/1959 | Lowry et al. | 322—28 |
| 2,945,174 | 7/1960 | Hetzler. | |
| 3,056,913 | 10/1962 | Henderson et al. | 322—28 |
| 3,136,939 | 6/1964 | Scott | 322—73 |
| 3,202,904 | 8/1965 | Madland | 307—88.5 |

JOHN F. COUCH, *Primary Examiner.*

LLOYD McCOLLUM, *Examiner.*

A. H. TISCHER, W. H. BEHA, *Assistant Examiners.*